May 8, 1962  J. E. TAYLOR  3,032,987
AUTOMOBILE GAS TURBINE CONTROL SYSTEM
Filed Feb. 19, 1957
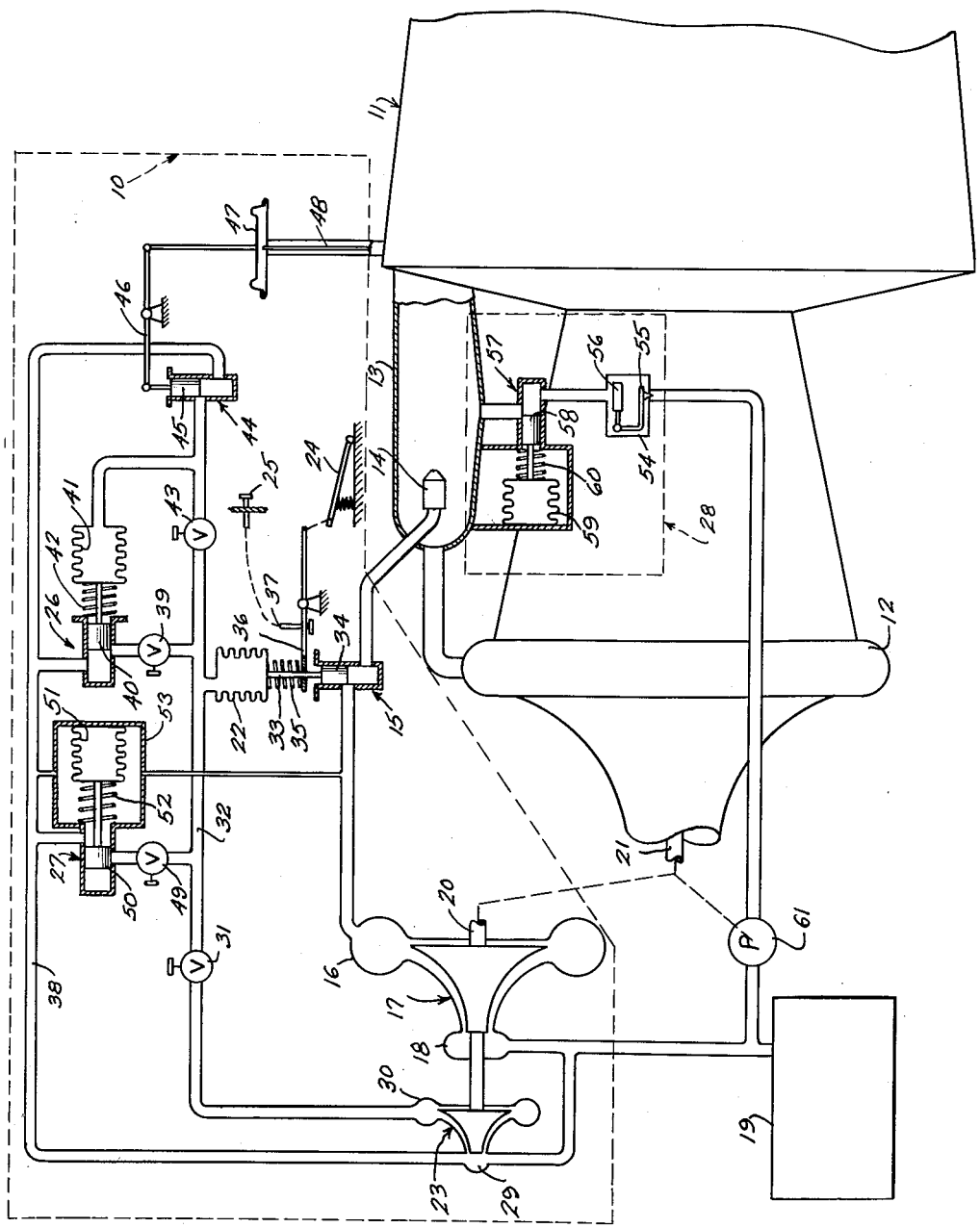
Inventor
JOHN E. TAYLOR

United States Patent Office 3,032,987
Patented May 8, 1962

3,032,987
AUTOMOBILE GAS TURBINE CONTROL SYSTEM
John E. Taylor, East Cleveland, Ohio, assignor to Thompson Ramo Wooldridge Inc., a corporation of Ohio
Filed Feb. 19, 1957, Ser. No. 641,094
4 Claims. (Cl. 60—39.28)

This invention relates to an automobile gas turbine control system and the primary object of this invention is to provide a fuel supply system constructed of components which are readily manufactured and assembled and which is trouble-free and reliable in operation and readily controlled to obtain optimum performance, while preventing damage to the turbine from excessive speeds and temperatures.

According to this invention, a throttle valve is controlled by a speed sensing device in the form of a centrifugal pump coupled to the turbine, to automatically regulate the fuel supply to maintain the turbine shaft rotational speed at the selected value, which is determined by the position of a hand or foot feed device. Thus the speed of operation does not vary from the value determined by the position of the hand or foot feed device, irrespective of variations in the load on the turbine.

Means are provided for responding to the temperature at a critical point of the turbine and controlling the action of the throttle valve to prevent overheating of the turbine.

A further feature is in the provision of means for maintaining proper operation of the control system irrespective of changes in the temperature of the fuel.

Another feature is in the provision of means for draining unburned fuel from the combustion chambers and returning the same to the supply system, not only to conserve fuel and prevent draining on the street, but also to prevent overheating and excessive speed during starting.

An important advantage of the invention resides in the fact that the centrifugal pump and various valves and other components of the system can be readily and inexpensively manufactured and assembled and yet are trouble-free, rugged and reliable in operation.

This invention contemplates other objects, features and advantages which will become more fully apparent from the following detailed description taken in conjunction with the accompanying drawing, in which the single FIGURE is a diagrammatic illustration of a turbine control system constructed according to the principles of this invention.

Reference numeral 10 generally designates a control system used to control the supply of fuel to a turbine 11 having the usual air compresser section 12 which supplies air to a combustion chamber 13. Only one combustion chamber is illustrated but it will be understood that a number may be provided. A fuel spray nozzle 14 is connected through a throttle valve 15 to the outlet 16 of a centrifugal fuel pump 17 having an inlet 18 connected to a fuel supply tank 19. The pump 17 has a shaft 20 which may be connected either directly or indirectly to the shaft 21 of the turbine.

The throttle valve 15 is controlled in response to the speed of operation of the turbine by means of a bellows 22 which responds to speed-sensing means in the form of a centrifugal pump 23, the operation being such that the speed is limited to a selected value. This value may be controlled either by a foot-operated control 24 or a hand-operated control 25. The fluid pressure from the control pump 23 which is proportional to the square of the speed is applied to the bellows 22, controlling the fuel flow through the throttle valve 15 and dictating the rotational speed of the turbine. Valve 26 is operated in response to the critical temperature at a certain point in the turbine, in a manner to reduce fuel flow through valve 15 which prevents excessive temperatures in the turbine.

A compensating valve 27 is actuated in response to variations in the temperature of the fuel, to adjust the system for variations in the density of the fuel.

A further feature of the invention is in the provision of a system generally designated by the reference numeral 28 for receiving unburned fuel from the combustion chamber 13 and returning the same to the supply system.

The control pump 23 has an inlet 29 connected to the fuel supply tank and an outlet 30 connected through an adjustable valve 31 to a conduit 32 which is connected to the bellows 22. The bellows 22 is connected through a rod 33 to a control member 34 of the valve 15. With an increase in the output pressure of the centrifugal pump 23, caused by an increase in speed thereof, the pressure in the bellows 22 will be increased to move the valve member 34 in a direction to restrict flow to the burner nozzle 14. This movement is opposed by a compression spring 35 which acts between the bellows 22 and one end of a lever 36, the other end of which is connected through a suitable mechanical linkage to the foot-operated control 24.

When the foot-operated control 24 is depressed, the lever 36 is rotated in a clockwise direction to increase the pressure applied to the bellows 22 by the spring 35. Accordingly, a greater pressure in the bellows 22 will be required to move the valve member 34 to a position in which it restricts flow, and hence the turbine will operate at a higher speed.

The position of the lever 36 may also be controlled by a member 37 mechanically coupled to the hand-operated control 25.

The valve 26 of the temperature-limiting system is connected to a conduit 38 which is connected to the inlet 18 of the fuel pump 17, and is also connected through an adjustable valve 39 to the conduit 32. The valve 26 has a control member 40 connected to a bellows 41, to which fluid pressure may be applied to urge the member 40 in a direction to restrict flow, against the action of a coiled compression spring 42. The fluid pressure applied to the bellows 41 could be directly controlled in response to the temperature at a critical point in the turbine. Preferably, however, additional means are employed to obtain a sensitive operation. In particular, the bellows 41 is coupled to the conduit 32 through an adjustable valve 43, and to the return conduit 38 through a valve 44. The valve 44 has a control member 45 connected to one end of a lever 46 with the other end of the lever 46 being connected to a diaphragm 47. The fluid pressure applied to one face of the diaphragm 47 is controlled in response to the temperature at a critical point in the turbine 11, as through a tube 48 which may operate with mercury vapor.

In operation, an increase in the temperature in the turbine will increase the pressure applied to the diaphragm 47 to move the valve member 45 in a flow-restricting direction, which will by itself increase the pressure in the conduit 32, and will also substantially increase the pressure applied to the bellows 41. An increase in the pressure in the bellows 41 will move the valve member 40 in a flow-restricting direction to further increase the pressure in the conduit 32 and hence the pressure applied to the bellows 22. This will cause movement of the throttle valve member 34 in a flow-restricting direction and thus decrease the supply of fuel to the turbine. Accordingly, by properly setting the valves, the temperature in the turbine can be limited to a safe value.

The compensating valve 27 is connected to the return conduit 38 and is also connected through an adjustable valve 49 to the conduit 32. The valve 27 has a control member 50 which is connected to a bellows 51 which functions to move the member 50 in a flow-increasing direction against the action of a coiled compression spring 52. The bellows 51 is disposed in a suitable chamber 53 which is connected at one side to the outlet of the fuel pump 17 and at the other side to the return conduit 38. The purpose of this arrangement is to allow a small amount of fuel flow through the chamber 53. The bellows 51 is filled with a suitable fluid the pressure of which increases and decreases as the temperature of the fuel increases and decreases.

In operation, an increase in the temperature of the fuel will cause the bellows 51 to expand and move the member 50 in a flow-increasing direction, to decrease the pressure in the conduit 32. This will compensate for a decrease in fuel weight flow through throttling valve 15, caused by an increase in the temperature of the fuel and a corresponding decrease in the density thereof, and a lower fuel supply pressure caused by lower density.

It will be appreciated that the various complements of the system as thus far described are all easy and inexpensive to manufacture and will give reliable trouble-free service. The use of the centrifugal speed-sensing pump 23 is not only an advantage from this standpoint, but also because it will provide an accurate speed signal, provided certain conditions are met. In particular, the centrifugal type pump, operated at a constant speed and with a constant density of liquid, will have an output pressure which is constant up to a certain value of flow, but with higher flow, the pump output pressure will decrease. This constant output pressure is a function of both speed and density, and with the density-compensating arrangement 27, the weight flow through valve 15 will be a function of speed. The valves of the system, and particularly the valve 31, should therefore be adjusted to limit the amount of flow to a value such that the pump output pressure will not be affected by slight changes in the flow rate.

The use of the centrifugal fuel pump 17 is also an advantage from the standpoints of inexpensive manufacture, and reliable operation. It is also an advantage in that the amount of flow from the centrifugal type of pump is approximately proportional to the square of the speed and the amount of fuel required for operation of the turbine at any constant speed. Because of these factors, the amount of fuel flow available for acceleration will be roughly proportional to the speed of operation and the size of the pump, and by properly sizing the pump, the acceleration of the turbine can be limited which is very important, particularly during the starting operation. In the event the fuel-air mixture does not ignite, liquid fuel may collect in combustion chamber 13. Such a fuel drains from the combustion chamber 13 into a storage tank 54 from which it is returned to the supply system. The tank 54 may usually be below the level of the supply tank 19, and a pump 61 may be provided to pump the fuel from the tank 54 to the tank 19, the pump 61 being driven either directly or indirectly from the turbine shaft 21. The tank 54 may be provided with a valve 55 controlled by a float 56 to provide an isolation effect.

Means are preferably provided for cutting off communication between the combustion chamber 13 and the tank 54 after ignition of the fuel takes place. For this purpose, a valve 57 is provided between the chamber 13 and the tank 54 the valve 57 comprising a valve member 58 connected to a bellows 59 which acts against a coiled compression spring 60. The bellows 59 may be filled with a suitable fluid and is arranged to be heated by heat developed in the combustion chamber 13. Such heat will expand the bellows to move the valve member 58 to the right as viewed in the drawing to cut off communication between the chamber 13 and the tank 54. When operation is shut down, and the combustion chamber cools, the valve member 58 will be returned to the open position.

It will be understood that modifications and variations may be effected without departing from the spirit and scope of the novel concepts of this invention.

I claim as my invention:

1. In a fuel control system for a gas turbine including a combustion chamber, a fuel pump driven by the turbine, a throttle valve between said fuel pump and the combustion chamber, a control pump driven by the turbine and having an inlet and an outlet, pressure-responsive means connected to said throttle valve, means establishing communication between said control pump outlet and said pressure-responsive means for urging said throttle valve in a flow-restricting direction as the output pressure of said control pump increases, first and second control valves each having an inlet and an outlet, means communicating said control valve outlets to said control pump inlet, means communicating said control valve inlets with said pressure-responsive means including flow-restriction means to establish a pressure at said second control valve inlet which is lower than the pressure at said pressure-responsive means, a pressure-responsive device mechanically coupled to said first control valve to control the fluid pressure at said pressure-responsive means, and means establishing fluid communication between said pressure-responsive device and said inlet of said second control valve, whereby said second control valve controls the pressure at said pressure-responsive device which controls said first control valve to control the pressure at said pressure-responsive means.

2. In a fuel control system for a gas turbine including a combustion chamber, a fuel pump driven by the turbine, a throttle valve between said fuel pump and the combustion chamber, a control pump driven by the turbine and having an inlet and an outlet, pressure-responsive means connected to said throttle valve, means establishing communication between said control pump outlet and said pressure-responsive means for urging said throttle valve in a flow-restricting direction as the output pressure of said control pump increases, first and second control valves each having an inlet and an outlet, means communicating said control valve outlets to said control pump inlet, means communicating said control valve inlets with said pressure-responsive means including flow-restriction means to establish a pressure at said second control valve inlet which is lower than the pressure at said pressure-responsive means, a pressure-responsive device mechanically coupled to said first control valve to control the fluid pressure at said pressure-responsive means, means establishing fluid communication between said pressure-responsive device and said inlet of said second control valve, whereby said second control valve controls the pressure at said pressure-responsive device which controls said first control valve to control the pressure at said pressure-responsive means, and means responsive to the temperature in said combustion chamber for controlling said second control valve.

3. In a fuel control system for a gas turbine including a combustion chamber, a fuel pump driven by the turbine, a throttle valve between said fuel pump and the combustion chamber, a control pump driven by the turbine and having an inlet and an outlet, pressure-responsive means connected to said throttle valve, means establishing communication between said control pump outlet and said pressure-responsive means for urging said throttle valve in a flow-restricting direction as the output pressure of said control pump increases, first and second control valves each having an inlet and an outlet, means communicating said control valve outlets to said control pump inlet, means communicating said control valve inlets with said pressure-responsive means including flow-restriction means to establish a pressure at said second control valve inlet which is lower than the pressure at said pressure-responsive means, a pressure-responsive device mechanically coupled to said first control valve to control the fluid pressure at said pressure-responsive means, means establishing fluid communication between said pressure-responsive device and said inlet of said second control valve, whereby said second control valve controls the pressure at said pressure-responsive device which controls said first control valve to control the pressure at said pressure-responsive means, a third control valve between said pressure-responsive means and said control pump inlet, a temperature-responsive device for controlling said third control valve, means defining a chamber surrounding said temperature-responsive device and having an inlet and an outlet, means communicating said chamber inlet with the outlet of said fuel pump, and means communicating said chamber outlet with the inlet of said fuel pump.

4. In a fuel control system for a gas turbine including a combustion chamber, a fuel pump driven by the turbine, a throttle valve between said fuel pump and the combustion chamber, a centrifugal control pump driven by the turbine and having an inlet and an outlet, pressure-responsive means connected to said throttle valve, means establishing communication between said control pump outlet and said pressure-responsive means for urging said throttle valve in a flow-restricting direction as the output pressure of said control pump increases, first and second control valves each having an inlet and an outlet, means communicating said control valve outlets to said control pump inlet, means communicating said control valve inlets with said pressure-responsive means including flow-restriction means to establish a pressure at said second control valve inlet which is lower than the pressure at said pressure-responsive means, a pressure-responsive device mechanically coupled to said first control valve to control the fluid pressure at said pressure-responsive means, means establishing fluid communication between said pressure-responsive device and said inlet of said second control valve, whereby said second control valve controls the pressure at said pressure-responsive device which controls said first control valve to control the pressure at said pressure responsive means, the paths of flow between said outlet and said inlet of said centrifugal control pump including the flow paths through said control valves being restricted to a point such that the output of said centrifugal control pump is not affected by variations in flow.

References Cited in the file of this patent

UNITED STATES PATENTS

| | | |
|---|---|---|
| 2,538,642 | Gardiner et al. | Jan. 16, 1951 |
| 2,551,241 | Buckland | May 1, 1951 |
| 2,564,127 | Orr | Aug. 14, 1951 |
| 2,578,501 | Boosinger | Dec. 11, 1951 |
| 2,643,514 | Jubb | June 30, 1953 |
| 2,658,566 | Wirth et al. | Nov. 10, 1953 |
| 2,670,599 | Davies et al. | Mar. 2, 1954 |
| 2,674,847 | Davies et al. | Apr. 13, 1954 |
| 2,707,864 | Taylor | May 10, 1955 |
| 2,712,218 | Ritter | July 5, 1955 |
| 2,756,810 | Simmons | July 31, 1956 |
| 2,757,511 | Jagger | Aug. 7, 1956 |
| 2,806,519 | Basford et al. | Sept. 17, 1957 |
| 2,848,868 | Jensen | Aug. 26, 1958 |